July 20, 1965  J. MULLER  3,195,730
FILTERING ASSEMBLY
Original Filed Nov. 30, 1956  3 Sheets-Sheet 1

INVENTOR
JACQUES MULLER
BY Young & Thompson
ATTORNEYS

July 20, 1965  J. MULLER  3,195,730
FILTERING ASSEMBLY
Original Filed Nov. 30, 1956  3 Sheets-Sheet 2

INVENTOR
JACQUES MULLER
BY Young & Thompson
ATTORNEYS

July 20, 1965

J. MULLER 3,195,730

FILTERING ASSEMBLY

Original Filed Nov. 30, 1956

INVENTOR
JACQUES MULLER

BY *Young + Thompson*

ATTORNEYS

United States Patent Office 3,195,730
Patented July 20, 1965

3,195,730
FILTERING ASSEMBLY
Jacques Muller, La Garenne-Colombes, France, assignor to Rellumit Inter, S.a.r.L., La Garenne-Colombes, France, a corporation of France
Continuation of application Ser. No. 625,436, Nov. 30, 1956. This application June 29, 1962, Ser. No. 206,428
Claims priority, application France, Jan. 18, 1956, 706,598, Patent 1,141,129
2 Claims. (Cl. 210—488)

The present invention is a continuation of my copending patent application Serial No. 625,436, filed November 30, 1956, and now abandoned, and relates to washers or plates with grooves or furrowed faces adapted to form when superposed a pervious packing for filter columns or blocks or sifting discs.

Washers or plates of this kind are known which have on their two faces parallel grooves or substantially oriented in a single direction. In the case of annular washers or plates in the form of square or rectangular frames having a central opening and adapted to form, when superposed, the pervious tubular packing of filter columns, there results inevitably two zones diametrically opposite which do not allow any passage of liquid because the secant grooves connect directly between two points of the exterior periphery without leaving any opening at the interior periphery of the tubular packing. A large portion of the peripheral surface of filter columns thus remains unutilized because the filtering can take place only in the zones where the grooves provide communication between the exterior peripheral surface and the interior peripheral surface.

Another disadvantage of grooves oriented in the same direction is that it is necessary to give each washer or plate a determined angular orientation in order that the grooves of the contact surfaces of the washers or plates will cross each other and not become embedded in each other. Such embedding would result in obstruction of the grooves and would destroy the filtering properties of the packing.

The object of the present invention is to overcome the above-pointed out disadvantages.

According to the invention the grooves formed in any suitable material in the two faces of the annular washers or rectangular frames extend with the same inclination in the same direction from the interior edge towards the exterior edge, or vice versa, which gives the assembly of grooves of each face an arrangement to some extent radial.

For the annular washers in particular, one feature of the invention consists in that the axes of all the grooves incline in the same direction, are tangent to a circle preferably internal, and concentric with the axis of the washer.

Another feature consists in that the width or depth of the grooves, or in other words the cross section of the grooves, increases progressively in the direction of flow of the fluid to be filtered, that is to say, from the interior periphery towards the exterior periphery of the washer when the filtering takes place from the interior to the exterior of the column, or in the opposite direction when the filtering takes place from the exterior towards the interior.

Due to the orientation to some extent tangential of all the grooves inclined in the same direction with respect to the two peripheral edges of each face of the annular washers, the total peripheral interior and exterior surfaces of the column of filtering packing formed by a stack of these washers, is utilised for filtering because these surfaces do not have any dead zones since each point of the exterior circumference is connected to a corresponding point of the interior circumference for the passage of fluid.

The arrangement of the grooves is identical on each face of a washer viewed in plan so that the grooves of two faces are crossed, which is also the case for the grooves of the surface of contact of two superposed washers. This crossing of the grooves of the contact surfaces is assured, whatever may be the angular orientation of the washer, so that there is no need to provide means giving each washer a predetermined orientation depending on the inclination of the grooves.

For greater clearness, the invention will be described hereinafter in detail with reference to the annexed drawings which show several embodiments thereof.

Figure 1:
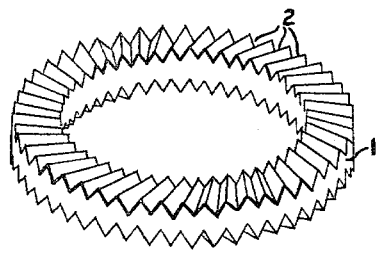
FIGURE 1 is a perspective view of an annular washer according to the invention in which the grooves are formed for filtering from the interior towards the exterior.

In the example shown in FIGURE 1 it will be seen that the annular washer 1 has on its two faces grooves 2 of triangular section and rectilinear axis. They have any desired dimensions which may be even microscopic with a width and a depth amounting to at least one micron for filtering fluid containing a suspension of extremely fine particles.

Figure 2:
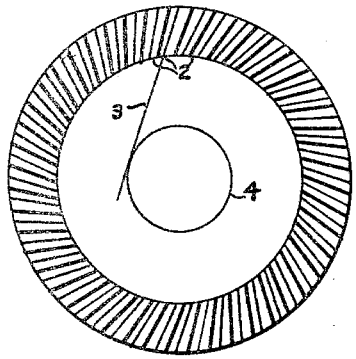
FIGURES 2 and 3 are plan views of the two faces of the washer of FIGURE 1.
Figure 3:
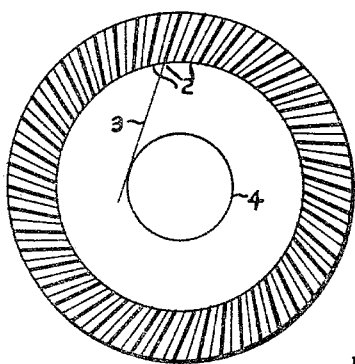
Figure 11:
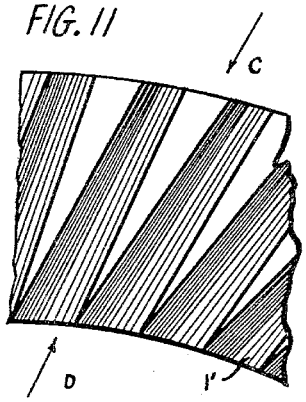
FIGURE 11 is a fragmentary detailed plan view on a larger scale of one face of the washer of FIGURE 8.
Figure 9:
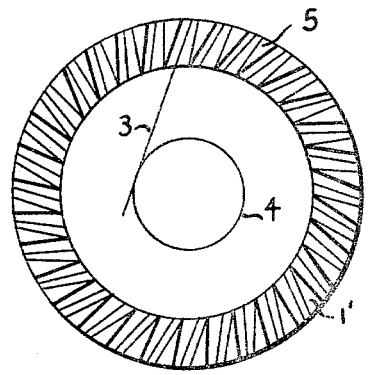
FIGURES 9 and 10 are plan views of the two faces of the washer of FIGURE 8.
Figure 12:
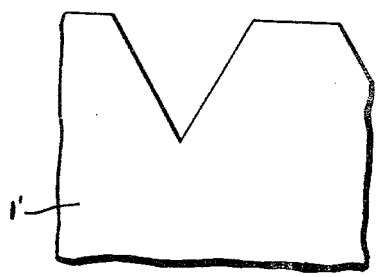
FIGURE 12 is a fragmentary detailed elevational view of the outer edge of the washer of FIGURE 8 taken in the direction of the arrow C in FIGURE 11.
Figure 8:
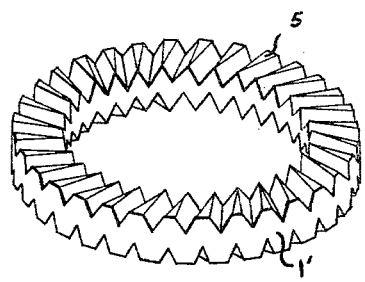
FIGURE 8 is a perspective view of an annular washer according to the invention in which the grooves are formed for filtering from the exterior towards the interior.
Figure 13:
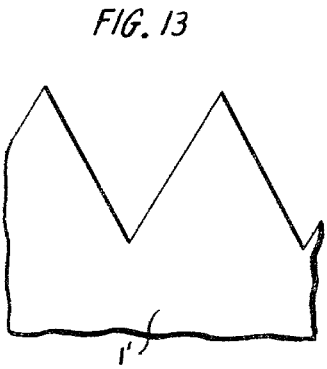
FIGURE 13 is a fragmentary detailed elevational view of the inner edge of the washer of FIGURE 8 taken in the direction of the arrow D in FIGURE 11.
Figure 10:
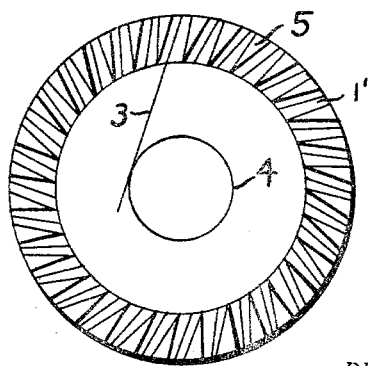

FIGURES 2 and 3 show that the two faces of the washers are identical. It will be noted particularly that the grooves 2 formed in these two faces extend with the same inclination in the same direction from the interior edge towards the exterior edge and vice versa, which gives to each face an aspect of lines to some extent radial.

This identical inclination and in the same direction of the grooves may be obtained by the fact that the axis 3 of all the grooves 2 are tangent to an imaginary circle 4 concentric with the peripheral edges of the washer. The degree of inclination of the grooves is thus determined by the diameter of the imaginary circle. It is possible, of course, to determine the inclination in any other manner.

The two faces being identical, it is obvious that their grooves cross each other, which signifies that the grooves of the upper face of a washer are crosswise to the grooves of the lower face of a superposed washer.

For this washer intended for filtering from the interior toward the exterior, the desired feature of the invention results automatically from the axes of the grooves being tangential to the imaginary circle 4 whereby these radiating axes and the sides of the grooves are spaced apart progressively from each other towards the exterior which gives the grooves a width and a cross section which progressively increases. In complementary fashion the depth can also be progressively increased as clearly shown in FIGURE 1. This increase of the cross section in the direction of flow of the fluid to be filtered gives an important advantage in that the solid particles which have penetrated into the channels formed by the superposition of a plurality of washers cannot become wedged in these channels, which avoids their obstruction. It is therefore less often necessary to disassemble the washers for washing since the clearing of the inlet openings of the channels over all the interior periphery of the washers can take place without disassembling the pervious packing.

Figure 4:
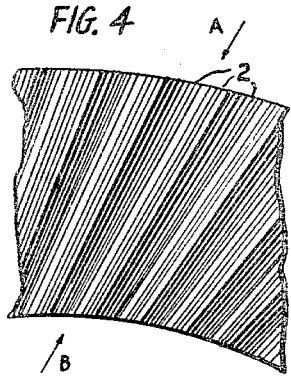
FIGURE 4 is a fragmentary detailed plan view on a larger scale of one face of the washer.

FIGURE 4 shows in plan and on a larger scale the details of either face of the washer. The arrangement and the profile of the grooves are clearly shown.

Figure 5:
FIGURE 5 is a fragmentary detailed elevational view of the outer edge of washer taken in the direction of the arrow A in FIGURE 4.
Figure 6:
FIGURE 6 is a fragmentary detailed elevational view of the inner edge of the washer taken in the direction of the arrow B in FIGURE 4.

FIGURES 5 and 6 show respectively the different profiles of the grooves over the exterior periphery and over the interior periphery of each washer.

Figure 7:
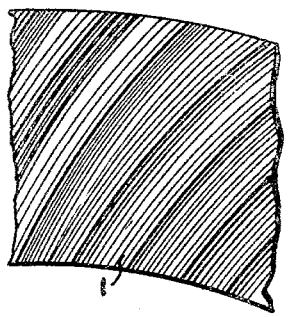
FIGURE 7 is a fragmentary detailed plan view on a larger scale of one face of a washer having curved grooves.

Obviously it is not indispensable to give the axes of the grooves a rectilinear form, as in the example of FIGURES 1 to 6. For example, these axes can be incurved in a manner shown in FIGURE 7 which may be of advantage in certain applications of filter columns with washers so constructed.

The explanations given above apply equally to the embodiment of the annular washer shown in FIGURES 8 to 13 except that the grooves 2 are profiled for filtering from the exterior towards the interior, that is to say, that their section increases progressively from the exterior towards the interior of each washer. The width of the section of the grooves at the interior periphery of each washer is then determined essentially by the spacing of their axes, whereby the smallest section on the exterior periphery can be arbitrarily chosen. This results inevitably in residual faces which can, however, be reduced to a minimum and which serve in any manner as support surfaces.

Figure 14:
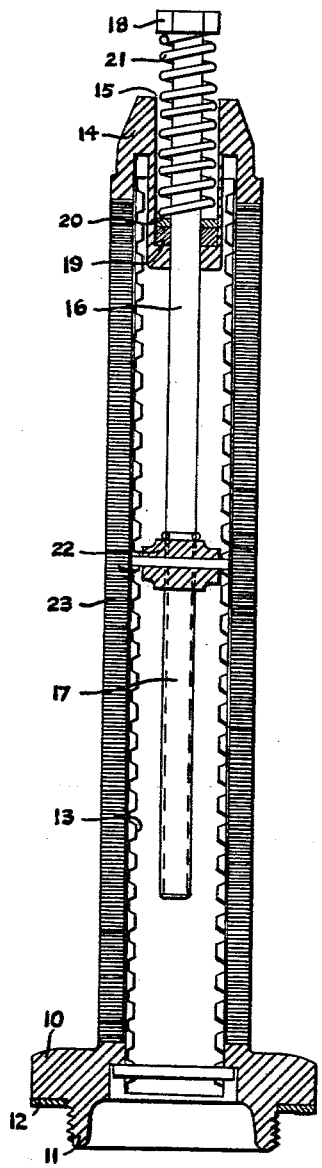
FIGURE 14 is a view in axial section through a filter column in which the pervious packing is formed by washers according to the invention.

FIGURE 14 shows a filter column utilising grooved washers according to the invention for the formation of the pervious packing.

This filter column comprises an annular base 10, the lower face of which is provided with the concentric cylindrical collar-like projection 11 threaded exteriorly and adapted to be screwed into a corresponding orifice formed in the separating partition (not shown), between the inlet chamber and the outlet chamber of filtering apparatus, the sealing being assured by a washer 12. In this base is axially embedded in any suitable manner one end of a perforated tube 13 which is provided with slotted embossed portions or openings of other form from end to end. The other end of this tube is covered by a cap 14. In the upper face of this cap there is provided a cylindrical recess 15 centered on the axis of the tube 13, and in the bottom of which is a central hole for the passage of a smooth rod 16. A part 17 of the rod near its lower end is screw-threaded while the upper end is provided with an actuating head 18. In the bottom of the recess 15 is located a sealing gasket 19 on which rests the pressing washer 20. Between this washer and the head 18 of the rod is interposed a compression and compensating spring 21. The threaded portion 17 of the rod is engaged in a nut 22 fixed to the interior of the tube 13 and concentric therewith. This tube 13 carries exteriorly between the base 10 and the cap 14 a filter packing 23 formed of annular washers according to the present invention. The packing may be compressed to any desired extent by screwing or unscrewing the rod 16 in the nut 22 which increases or reduces the tension of the spring 21 and the pressure exerted by the cap 14 on the stack of washers.

The spring 21 interposed between the head 18 of the rod 16 and the bottom of the cap 14 serves the function of compensating the expansion during the operation of the filter column for maintaining a pressure as constant as possible on the washers forming the pervious packing 23. This column can serve for filtering from the interior to the exterior with washers of the type shown in FIGURE 1, or for filtering from the exterior toward the interior with washers of the type shown in FIGURE 8.

Figure 15:
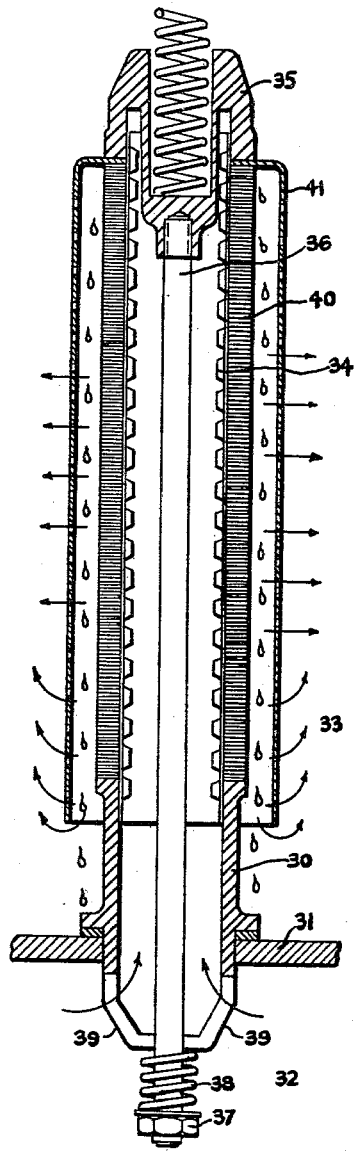
FIGURE 15 is an axial section of a column of pervious packing formed by washers according to the invention, but adapted for the separation of liquids of different densities.

FIGURE 15 shows another embodiment of a column with pervious packing formed by washers according to the invention used not for filtration but for separation of two liquids of different densities. It is known that the forced flow of an emulsion through a porous mass results in breaking of the emulsion and that the forced flow of a mixture of liquids of different densities results in the separation of these liquids. Now it has been found that the same result is obtained by forcing an emulsion or a mixture of liquids through the microscopic channels of a pervious packing formed by washers according to the invention.

The column illustrated comprises the hollow base 30 in the form of a cup which is fixed by means of a flange in an opening formed in the partition 31 which separates the inlet chamber from the decantation chamber 33 of the separator. In the cuplike base 30 is an embedded perforated tube 34 which is provided with perforated or slotted embossing or other openings from one end to the other and which has its free end covered by a cap 35. In the bottom of this cap is screwed a central rod 36 which can pass freely through a central hole in the bottom of the base 30. The lower end of this rod is screw-threaded and carries a nut 37. Between this nut and the bottom of the base 30 is interposed a compression spring 38. In the lower part of the base 30 are formed orifices 39 for the flow of the emulsion or mixture. The upper edge of the base 30 has a peripheral flange surrounding the tube 34 and adapted to provide a seat for the pervious packing 40 formed by the annular washers according to the present invention stacked about the tube. This packing is thus interposed between the base 30 and the cap, and it may be more or less tightened by screwing or unscrewing the nut 37, the spring 38 acting as a compensating means for expansion as in the preceding example, as shown in FIGURE 14. Between the cap 35 and the uppermost washer of the packing 40 there is clamped the bottom of a precipitation bell 41, the peripheral wall of which is perforated, slotted, or rendered permeable in any other manner from one end to the other.

The mixture of two liquids of different densities, for example, enters through the bottom of the base 30 into the tube 34, flows from the interior toward the exterior through the microscopic channels provided by the stacked washers 40, and the bell 41 receives the two separated liquids. It allows the lighter liquid to escape through its perforations and to rise, but it obliges the heavier liquid to descend and collect on the partition 31 from which it can be discharged. FIGURE 15 shows a vertical arrangement but, if desired, the arrangement may be horizontal.

It is understood that the invention is not limited to the examples described and shown in the drawings since other embodiments and modifications can be made without departing from the principle of the invention.

I claim:

1. A filtering assembly comprising a plurality of thin filtering plates disposed in superimposed relationship to define a tubular filtering column through which a liquid to be filtered flows from one periphery thereof to the other, each filtering plate being annular and provided with a plurality of microscopic grooves in both surfaces thereof, said grooves being contiguous to each other, each groove extending between the inner and outer peripheral edges of the plate, each groove having a triangular cross section which has a predetermined size to keep minute foreign particles of at least said predetermined size from entering the groove, each groove progressively increasing in depth and width in the direction of filtration of the liquid so that minute particles less than said predetermined size will pass freely through the groove during filtration without becoming wedged therein, the lengthwise axes of all the grooves in each surface being inclined in the same general direction and being tangent to an imaginary circle on the interior of the plate which is concentric with the axis of the annular plate; said grooves in having a similar inclination in each surface of each filter plate contacting the top surfaces of the grooves in an adjacent filter plate in crosswise relationship thereby utilising a large proportion of the peripheral surface of the tubular filtering column.

2. A filtering assembly as claimed in claim 1, in which the triangular cross section of the grooves is substantially equilateral.

References Cited by the Examiner
UNITED STATES PATENTS 1,974,235  9/34  Cammen _____ 210—497 X

FOREIGN PATENTS 687,967  2/53  Great Britain.
433,260  4/48  Italy.

REUBEN FRIEDMAN, *Primary Examiner.*
HARRY B. THORNTON, HERBERT L. MARTIN,
*Examiners.*